(12) United States Patent
Zhao et al.

(10) Patent No.: US 10,667,295 B2
(45) Date of Patent: May 26, 2020

(54) METHOD FOR INTERNET OF VEHICLES (IOV) ELECTRIC TRAFFIC SIGN INFORMATION BROADCAST WITH QUALITY OF SERVICE (QOS) GUARANTEED MECHANISM BASED ON CONFLICT DETECTION (71) Applicant: CHANG'AN UNIVERSITY, Xi'an (CN)

(72) Inventors: Xiangmo Zhao, Xi'an (CN); Zhigang Xu, Xi'an (CN); Xiaochi Li, Xi'an (CN); Licheng Zhang, Xi'an (CN); Runmin Wang, Xi'an (CN); Haigen Min, Xi'an (CN); Pengpeng Sun, Xi'an (CN); Nan Li, Xi'an (CN); Zhen Wang, Xi'an (CN); Jinchao Hu, Xi'an (CN)

(73) Assignee: CHANG'AN UNIVERSITY, Xi'an (CN)

( * ) Notice: Subject to any disclaimer, the term of this patent is extended or adjusted under 35 U.S.C. 154(b) by 170 days.

(21) Appl. No.: 15/806,699

(22) Filed: Nov. 8, 2017

(65) Prior Publication Data

US 2018/0132281 A1 May 10, 2018

(30) Foreign Application Priority Data

Nov. 8, 2016 (CN) .......................... 2016 1 0981545

(51) Int. Cl.
*H04W 74/08* (2009.01)
*G08G 1/0967* (2006.01)
(Continued)

(52) U.S. Cl.
CPC ........ *H04W 74/0808* (2013.01); *G08G 1/091* (2013.01); *G08G 1/092* (2013.01); *G08G 1/093* (2013.01); *G08G 1/09675* (2013.01); *G08G 1/096716* (2013.01); *G08G 1/096783* (2013.01); *H04L 47/2433* (2013.01); *H04W 4/06* (2013.01); *H04W 4/44* (2018.02); *H04W 74/085* (2013.01); *H04L 47/14* (2013.01); *H04L 67/12* (2013.01); *H04W 28/0268* (2013.01)

(58) Field of Classification Search
None
See application file for complete search history.

(56) References Cited

U.S. PATENT DOCUMENTS

| 2014/0082114 | A1* | 3/2014 | Vadassery | H04W 4/00 709/207 |
| 2017/0085417 | A1* | 3/2017 | O'Reirdan | H04L 41/0668 |
| 2017/0339721 | A1* | 11/2017 | Mukherjee | H04W 28/08 |

* cited by examiner

*Primary Examiner* — Chi H Pham
*Assistant Examiner* — Raul Rivas
(74) *Attorney, Agent, or Firm* — Wayne & Ken, LLC; Tony Hom (57) ABSTRACT

The present disclosure discloses a method for Internet of Vehicles (IoV) electronic traffic sign information broadcast with Quality of Service (QoS) guaranteed mechanism based on conflict detection. Compared with the traditional WLAN applied in electronic traffic sign information broadcast, the present disclosure significantly reduces the information broadcast delay, and at the same time provide QoS guaranteed service for the information broadcast. It allows IoV, through distributed algorithm, to achieve the electronic traffic sign information broadcast with self-organization framework, short transmission delay and high efficiency.

1 Claim, 5 Drawing Sheets

(51) Int. Cl.
G08G 1/09 (2006.01)
H04W 4/06 (2009.01)
H04L 12/851 (2013.01)
H04W 4/44 (2018.01)
H04L 12/801 (2013.01)
H04L 29/08 (2006.01)
H04W 28/02 (2009.01)

Fig.1

| P | QoS | Application | Description of QoS | Contention Window |
|---|---|---|---|---|
| 0 | Social event information | Natural disaster report<br><br>Great event report and the like | Broadcast of social information with the highest priority | 0 |
| 1 | Traffic sign information | Broadcast of traffic light condition<br><br>Vehicle speed suggestions based on changes of traffic lights phase and the like | Traffic sign information broadcast with high relevance to the timeliness | 1 |
| 2 | Normal traffic sign information | Electronic traffic sign information broadcast<br><br>Precaution of accident<br><br>Precaution on corner speeding and the like | Traffic sign information broadcast with medium relevance to the timeliness | 2 |
| 3 | Non-traffic safety information | Reminding of interest point<br><br>Reminding of traffic conditions and the like | Broadcast of non-traffic safety information | 5 |

METHOD FOR INTERNET OF VEHICLES (IOV) ELECTRIC TRAFFIC SIGN INFORMATION BROADCAST WITH QUALITY OF SERVICE (QOS) GUARANTEED MECHANISM BASED ON CONFLICT DETECTION

TECHNICAL FIELD

The present disclosure relates to a technical field of Internet of Vehicles (IoV), and more specifically, to a method for Internet of Vehicles (IoV) electronic traffic signs with Quality of Service (QoS) guaranteed mechanism based on conflict detection.

BACKGROUND

IoV connects transport elements such as pedestrians, vehicles, road-side units with networks of traffic management services through information and communication technology such as sensor technology, information acquisition technology, network access technology, transmission technology, with vehicles and road-side units as communication terminals, and performs vehicle assisted driving, navigation, information acquisition and distribution, and internet access and the like to improve safety, mobility and the environment. IoV aims at improving traffic conditions, increasing travel efficiency and developing information interactive pattern. IoV is able to overcome the problems of vulnerability of existed physical traffic signs, limited quantity of information, difficulty of understanding, and bad alert effect by traffic sign information, and at the same time develops functions of traffic signs, partly improve efficiency of traffic sign information distribution, ensure driving safety and improve transportation capability of the total society.

However, the existed method for IoV electronic traffic sign information broadcast has problems. The Wireless Local Area Networks (WLAN) adopts Carrier Sense Multiple Access/Conflict Avoidance (CSMA/CD) and response technology cooperating EDCA to achieve QoS assurance. This transmission mode has a long transmission delay, a low channel utilization under the condition of many terminals, and is unable to adjust a topology of dynamic changes in IoV environment and to adjust a high requirement of real-time information.

SUMMARY

Aiming at the problems and deficiencies existed in the prior art, the purpose of the present disclosure is to provide a method for IoV traffic sign information broadcast with QoS guaranteed mechanism based on conflict detection. This method not only overcomes the problems of long transmission delay under CSMA/CA, but also achieves the QoS guaranteed mechanism with complex traffic information broadcast. It allows IoV, through distributed algorithm, to achieve the electronic traffic sign information broadcast with the self-organization framework, short transmission delay and high efficiency.

In order to achieve the purpose mentioned above, the present invention adopts the following technical solutions.

A method for Internet of Vehicles (IoV) electronic traffic sign information broadcast with Quality of Service (QoS) guaranteed mechanism based on conflict detection comprises the following steps.

Step 1: installing a road-side unit on the road. Wherein the road-side unit obtains traffic sign information sent by a traffic manager, and the traffic sign information comprises a plurality of messages.

Step 2: organizing the plurality of messages obtained by the road-side unit. Each of the organized message comprises a road-side unit information authentication, a message count, an event type, a priority, an event location, vehicle restriction information, an event content, associated information and a check bit.

Step 3: broadcasting the organized plurality of messages by the road-side unit. Detailed broadcast processes further comprise the following steps.

Step 3.1: prioritizing each of the organized messages with a priority P, and the priority P is given a value of 0, 1, 2 or 3 according to a type of message. Sending the prioritized message by the road-side unit to a logic link control layer of the road-side unit in a communication protocol.

Step 3.2: sending a request to a medium access control layer from the logic link control layer of the road-side unit, calculating a corresponding Variable Inter Frame Space (VIFS) of each piece of the prioritized message by the logic link control layer according to the value of priority P.

Step 3.3: sending the prioritized message to a physical layer from the medium access control layer according to VIFS calculated in the step 3.2 using conflict detection and broadcasting the prioritized message.

Step 4: receiving the broadcasted message from the physical layer by an on-board unit, sending information matched with a vehicle of the on-board unit to the driver in the vehicle.

Specifically, in the step 3.3, sending the prioritized message to a physical layer from the medium access control layer according to VIFS calculated in the step 3.2 using conflict detection and broadcasting the prioritized message comprises the following steps.

Step 3.3.1: receiving the prioritized message by the medium access control layer in a separate channel, judging if a channel is idle; if yes, wait for VIFS and perform step 3.3.2; otherwise, wait until the channel is idle, then wait for VIFS and perform step 3.3.3.

Step 3.3.2: judging if a channel is idle; if yes, broadcast the prioritized message; otherwise, wait until the channel is idle, then wait for VIFS and perform step 3.3.3.

Step 3.3.3: judging if a channel is idle; if yes, install a non-zero avoidance counter and perform step 3.3.4; if no, wait until the channel is idle, then wait for VIFS and perform the step 3.3.3.

Step 3.3.4: judging if a channel is idle; if no, then wait for VIFS and perform step 3.3.4 again; if yes, perform step 3.3.5.

Step 3.3.5: judging if an avoidance counter is zero; if no, subtract one in the avoidance counter and perform the step 3.3.4; if yes, then wait for VIFS and perform step 3.3.6.

Step 3.3.6: judging if a channel is idle; if yes, send the prioritized message to the physical layer and broadcast the prioritized message; if no, perform the step 3.3.4.

Specifically, in the step 4, receiving the broadcasted message from the physical layer by an on-board unit and sending information matched with a vehicle of the on-board unit to the driver in the vehicle comprises the following steps.

Step 4.1: after receiving the broadcasted message by the on-board unit, judging if the broadcasted message is received or processed; if yes, perform the step 3.3.4; if no, perform step 4.2.

Step 4.2: judging if the broadcasted message is related with other messages; if yes, co-process the broadcasted message and other information; if no, process the broadcasted message and other information separately and perform step 4.3.

Step 4.3: reading direction information and distance information of an event included in the broadcasted message, reading the vehicle restriction information and processing the event content. Judging if the related information of the broadcasted message is blank, if yes, perform step 4.4; otherwise, save the broadcasted message for the next processing, and return to the step 4.1.

Step 4.4: judging if the check bit of the broadcasted message is correct; if yes, perform step 4.5; otherwise, return to the step 4.1.

Step 4.5: processing the broadcasted message by the on-board unit and sending the processed information through multimedia to the driver in the vehicle.

Compared with the prior art, the present disclosure has the following technical effect.

1. The present disclosure provides a proper design on broadcast of electronic traffic sign information and a control flow, and allows full play to the characteristics of a fast response rate and a convenient installation during the transmission delay of the wireless communication technology. The present disclosure provides a convenient management control access and provides drivers with accurate and effective traffic sign information.

2. The present disclosure designs a binary random avoidance mode utilized in road-side unit broadcast and enables nodes to search time-frequency resources without 3 times handshaking and to achieve traffic sign information broadcast, thereby ensuring a timeliness during transmission of the traffic sign information.

3. In the conflict detection, nodes inside and outside simultaneously start a binary random avoidance for different requirements, and take different avoidance strategies for different priority information. An adjustable IFS is utilized to set up different priorities for contention. This approach introduces the QoS mechanism to the unreliable communication, and in the meanwhile overcomes the problems of long transmission delay with QoS guaranteed mechanism achieved by the traditional EDCA based on CSMA/CA. Combining mechanisms of site competition and site internal competition, different priority information is involved directly in site competition to effectively improve the channel utilization and reduce the transmission delay.

Compared with the traditional WLAN applied in electronic traffic sign information broadcast, the present disclosure significantly reduces the information distribution delay, and at the same time provide QoS guaranteed service for the information broadcast. It allows IoV, through distributed algorithm, to achieve the electronic traffic sign information broadcast with self-organization framework, short transmission delay and high efficiency.

Combined with figures and detailed embodiments, detailed description and explanation are further provided below.

DETAILED DESCRIPTION

The method for electronic traffic sign broadcast proposed in the present embodiment is applied to IoV, for improving a system capacity in the IoV electronic traffic sign broadcast, reducing the transmission delay and realizing the QoS guaranteed service. This method involves the road-side unit, the transmission method, and the on-board unit. In the present embodiment, RSU represents the road-side unit, and the OBU represents the on-board unit. The method for IoV electronic traffic sign broadcast with QoS guaranteed mechanism based on conflict detection in the present disclosure comprises the following steps.

Figure 1:
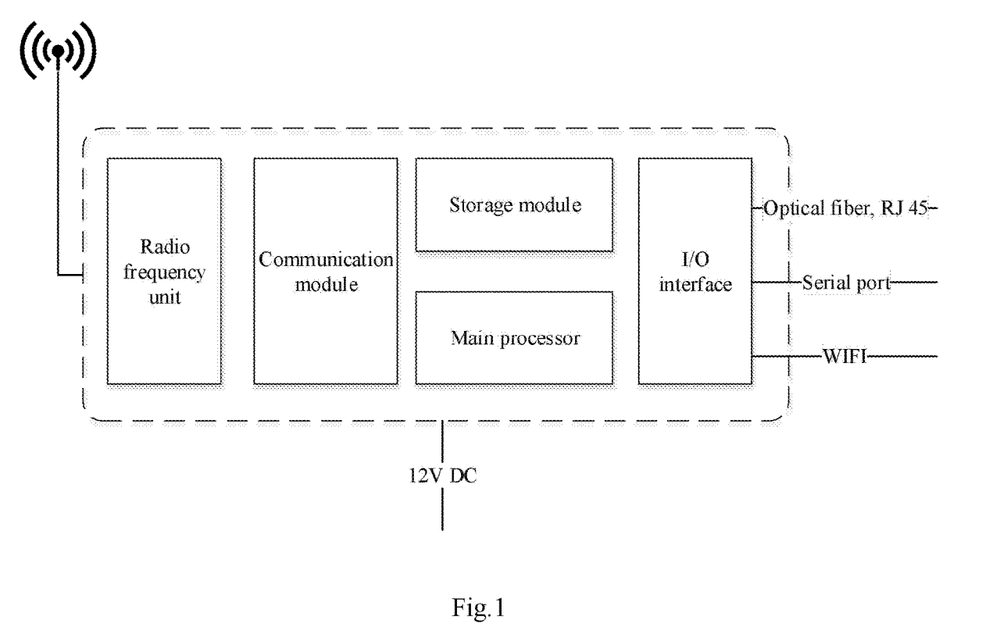
FIG. 1 shows a schematic diagram of the function module of the road-side unit in the present disclosure.

Step 1: the road-side unit, namely RSU, is usually installed on a high construction at a road-side, such as a top of a traffic signal pole or a traffic sign pole. The main structure of the RSU is shown in FIG. 1, including a radio frequency unit, a communication module, a storage module, a main processor and an I/O interface. RSU accesses to the setting information of traffic managers, through a cellular network, an optical fiber network and other access networks, to initialize the settings. A method for the setting up is shown as follows.

The road-side unit reads socket cache information of a specific controlled interface to refresh a content of traffic sign information to be published in a duty cycle, and the content of the traffic sign information includes a plurality of messages. If the socket cache information of the controlled interface is not empty, then information will be updated and the updated results will be recorded, and step 2 will be performed for an information processing flow. If the socket cache information of the controlled interface is empty, then step 2 will be performed for the information processing flow directly based on the previous setting content.

Step 2: RSU organizes the traffic sign information which needs to be distributed according to a special agreement. Every message comprises a road-side unit information authentication, a message count, an event type, a priority, an event location, vehicle restriction information, an event content, related information and a check bit.

Wherein the road-side unit information authentication is utilized to describe a unique identity of a road-side unit of the information sent. The message count counts for a current information flow number i=1, 2, . . . , M.

Figure 3:
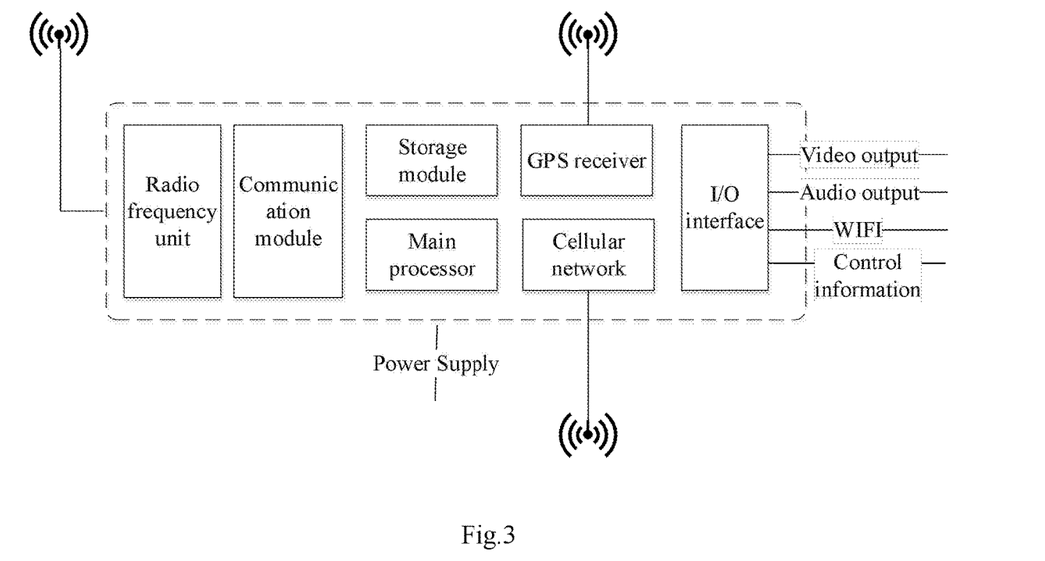
FIG. 3 shows a schematic diagram of the function module of the on-board unit in the present disclosure.

The event type is classified basically into a warning sign, a ban sign, an indication sign and a directional sign, and can be extended to a tourist areas sign, other signs, etc. The priority is utilized to determine a priority of the information, and information with low priority will be covered by the OBU. And a priority parameter p is equal to 0, 1, . . . , 7. The event location is a specific location of a traffic event indicated by the traffic signs, described by an event direction and distance. Vehicle restriction information includes vehicle type information and other restrictions, for a screening of an audience of the traffic information. Event content is a specific description of the event as a text part of the traffic signs. The associated information is utilized to associate a previous text when traffic sign information is not completed. The check bit is utilized to verify correctness of a message. The content of the electronic traffic signs is shown in FIG.

3. After completing the information organization, step 3 will be performed for an avoidance distributing flow.

Step 3: RSU distributes the organized messages, specifically comprising the following steps.

Step 3.1: the type of the information is confirmed to prioritize the information.

Figure 2:
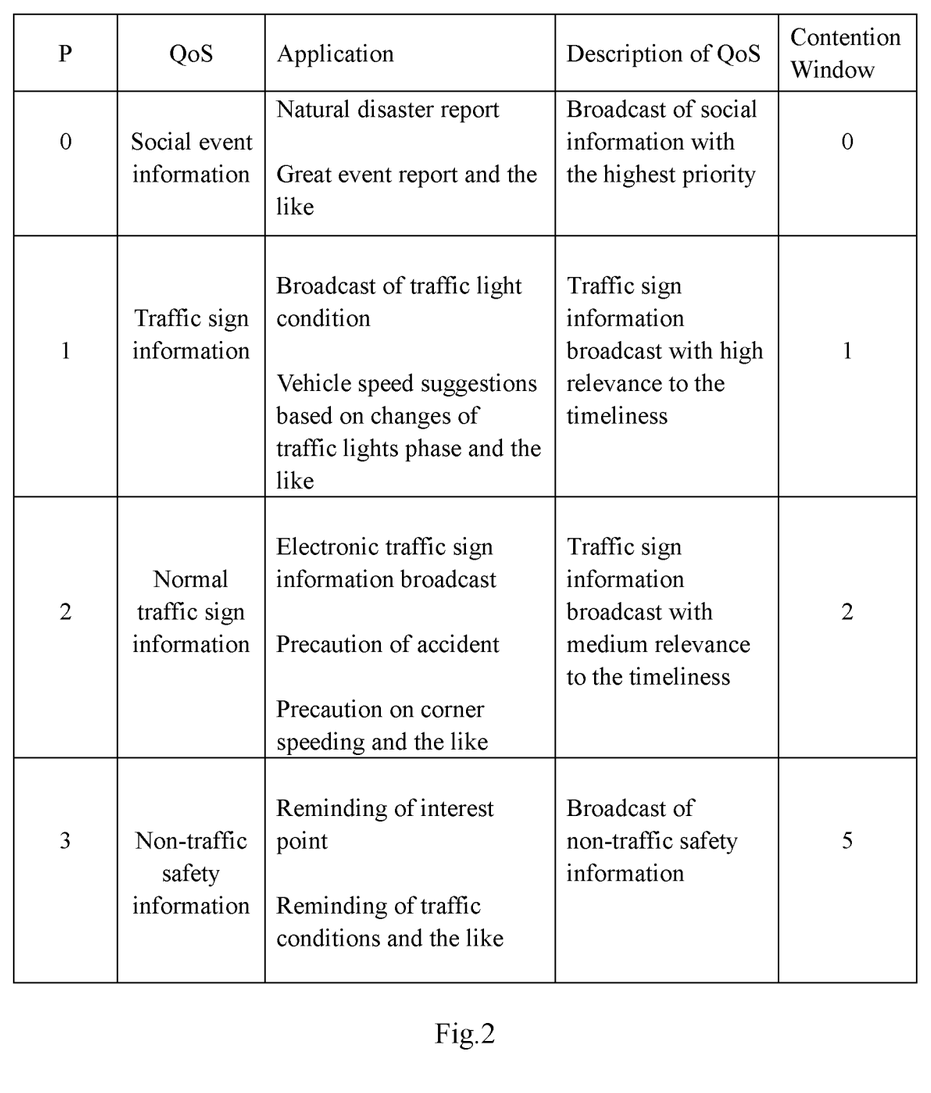
FIG. 2 shows a classification description of the QoS with different priorities in the present disclosure.

The electronic traffic signs are classified into 4 types and priorities are respectively social event information, traffic light identification information, normal traffic sign information and non-safety traffic information. Priority numbers P of these four types are respectively 0, 1, 2 or 3. The corresponding information types are shown in FIG. 2. The priority information is then sent to the logic link control layer of the road-side unit in a communications protocol.

Step 3.2: a request is sent to a medium access control layer by the logic link control layer of the road-side unit. A corresponding Variable Inter Frame Space (VIFS) of every piece of information is calculated by the logic link control layer according to the value of priority P. VIFS is calculated by:

VIFS=SIFS+aSlotTime×P, wherein SIFS is short inter frame space, and aSlotTime is a length of slot time.

Figure 4:
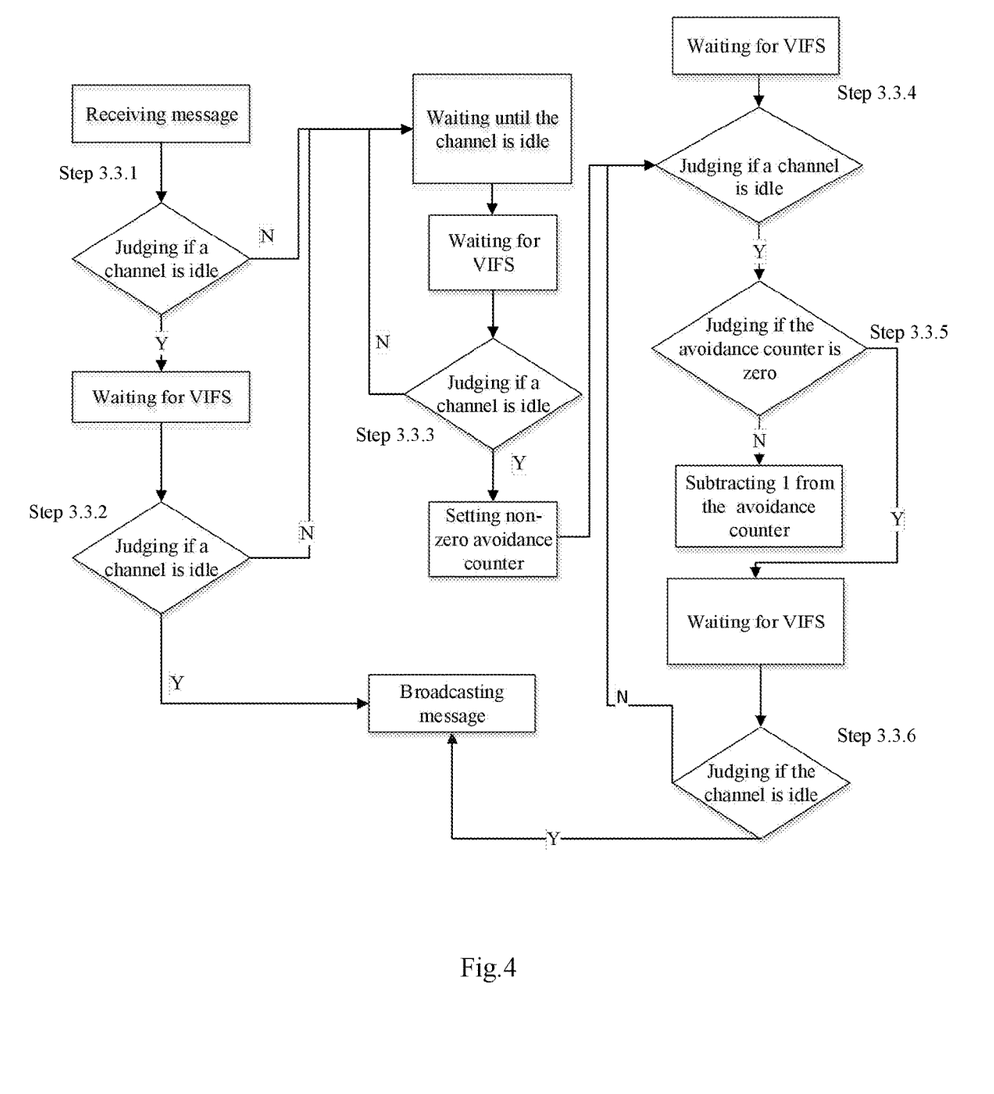
FIG. 4 shows a flow diagram conflict when the message is achieved in media access control layer by conflict detection in the present disclosure.

Step 3.3: Medium access control and broadcast of the information are achieved using conflict detection. Referring to FIG. 4, detailed procedures are as follows.

Step 3.3.1: receiving the prioritized information by the medium access control layer in a separate channel, judging if a channel is idle; if yes, wait for VIFS and perform step 3.3.2; otherwise, wait until the channel is idle, then wait for VIFS and perform step 3.3.3.

Step 3.3.2: judging if a channel is idle; if yes, broadcast the prioritized information; otherwise, wait until the channel is idle, then wait for VIFS and perform step 3.3.3.

Step 3.3.3: judging if a channel is idle; if yes, install a non-zero avoidance counter and perform step 3.3.4; if no, wait until the channel is idle, then wait for VIFS and perform the step 3.3.3.

Step 3.3.4: judging if a channel is idle; if no, then wait for VIFS and perform step 3.3.4 again; if yes, perform step 3.3.5.

Step 3.3.5: judging if an avoidance counter is zero; if no, subtract one in the avoidance counter and perform the step 3.3.4; if yes, then wait for VIFS and perform step 3.3.6.

Step 3.3.6: judging if a channel is idle; if yes, send the prioritized information to the physical layer and broadcast the prioritized information; if no, perform the step 3.3.4.

Step 4: receiving the broadcasted message from the physical layer by an on-board unit, sending information matched with a vehicle of the on-board unit to the driver in the vehicle.

Figure 5:
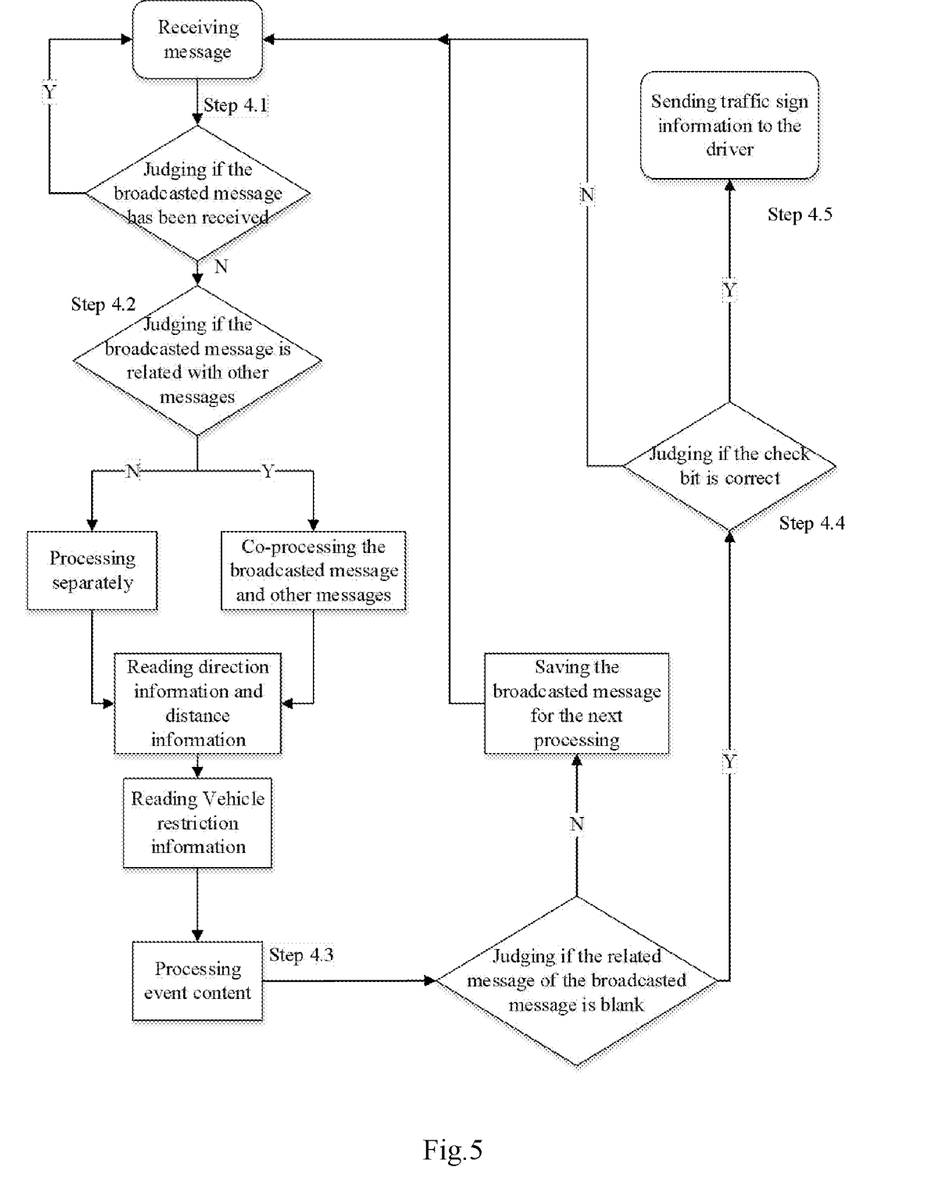
FIG. 5 shows a processing flow diagram of when the on-board unit receives a physical layer broadcast in the present disclosure.

The on-board unit is herein after referred to as OBU. An OBU comprises a radio frequency unit, a communication module, a GPS receiver, a dead reckoning sensor (such as inertial navigation, image, etc.), a main processor and a necessary I/O interface. The OBU is responsible for receiving the electronic traffic sign information from the RSU, and sending to a driver through an image, sound, etc. A basic structure of the OBU is shown in FIG. 3. Referring to FIG. 5, specific procedures are as follows.

Step 4.1: after receiving the broadcasted message by the on-board unit, judging if the broadcasted message is received or processed; if yes, perform the step 3.3.4; if no, perform step 4.2.

Step 4.2: judging if the broadcasted message is related with other messages; if yes, co-process the broadcasted message and other message; if no, process the broadcasted message and other message separately and perform step 4.3.

Step 4.3: reading direction information and distance information of an event included in the broadcasted message, reading the vehicle restriction information and processing the event content. Judging if the related information of the broadcasted message is blank, if yes, perform step 4.4; otherwise, save the broadcasted message for the next processing, and return to the step 4.1.

Step 4.4: judging if the check bit of the broadcasted message is correct; if yes, perform step 4.5; otherwise, return to the step 4.1.

Step 4.5: processing the broadcasted message by the on-board unit and sending the processed information through multimedia to the driver in the vehicle.

The direction information and the distance information are to describe the direction and distance of an event. The direction of north is set to be 0, counting 360 degrees clockwise. Distance is in meters; an effective position of an optional event can be a point or a section of distance.

Vehicle restriction information includes a choice of vehicle model. It includes a small passenger vehicle, a large passenger vehicle, a truck, a trailer, a semi-trailer, weight information, axle information and the like.

The content of the event is a specific content of each type of traffic signs.

The associated information bit is utilized when the information is not fully expressed in the message, to state a message count of the next associated message. The next content of the event containing the message of the message count is the follow-up.

The check bit is to verify if there is an error in the transmitted data. When an on-board unit receives information, whether this information has been received and processed will be determined through information authentication. If the information is processed, no more processing is needed; A processing message count determines whether the information is associated with the previous information. The event type is to dealt with events separately. The direction information and the distance information are to give a clear indication. The vehicle restriction information is to filter whether it is needed to communicate the information or a part of the information to a driver of a vehicle. The content of the event is the content sent to the driver by the vehicle. If the associated information is not empty, the existing data is stored waiting for a target data to be processed together. The check bit is to verify if there is any error for all the data.

The method for IoV electronic traffic sign information broadcast in the present embodiment, through setting up QoS priority of RSU and using the avoidance algorithm for channel requisition, ensures that the traffic sign information broadcast is achieved with the lowest possibility of transmission delay under wireless channel conditions, and assures QoS of different information at the same time. In the meanwhile, a matched media access control layer inter-layer communication protocol is designed for this kind of broadcast method. It is illustrated in the basic structures and the working flow of the RSU and the OBU needed in the traffic sign information broadcast, so as to ensure that the electronic traffic sign broadcast under the condition of IoV is a feasible method with low transmission delay and high efficiency.

What is claimed is:

1. A method for Internet of Vehicles (IoV) electronic traffic sign information broadcast with Quality of Service (QoS) guaranteed mechanism based on conflict detection, characterized in that the method comprises the following steps:

step 1: installing a road-side unit on the road; wherein the road-side unit obtains traffic sign information sent by a traffic manager, and the traffic sign information comprises a plurality of messages;

step 2: organizing the plurality of messages obtained by the road-side unit; each of the organized messages comprises a road-side unit information authentication, a message count, an event type, a priority, an event location, vehicle restriction information, an event content, associated information and a check bit;

step 3: broadcasting the organized plurality of messages by the road-side unit; detailed broadcast processes further comprise the following steps:

step 3.1: prioritizing each of the organized messages with a priority P, and the priority P is given a value of 0, 1, 2 or 3 according to a type of the message; sending the prioritized message by the road-side unit to a logic link control layer of the road-side unit in a communication protocol;

step 3.2: sending a request to a medium access control layer from the logic link control layer of the road-side unit, calculating a corresponding Variable Inter Frame Space (VIFS) for each piece of the prioritized message by the logic link control layer according to the value of priority P;

step 3.3: sending the prioritized message to a physical layer from the medium access control layer according to VIFS calculated for the prioritized message in the step 3.2 using conflict detection and broadcasting the prioritized message, wherein sending the prioritized message comprises:

determining an idle channel;

occupying the idle channel and refraining from sending the prioritized message for a time period of a length equal to the VIFS calculated for the prioritized message;

determining that the channel is still idle after the time period of the length equal to the VIFS calculated for the prioritized message; and sending, on the idle channel, the prioritized message to the physical layer; and step 3.4: determining whether a channel is idle; if no, then wait until VIFS, then continue to step 4;

step 4: receiving the broadcasted message from the physical layer by an on-board unit, sending message matched with a vehicle of the on-board unit to the driver in the vehicle, wherein in the step 4, receiving the broadcasted message from the physical layer by an on-board unit and sending information matched with a vehicle of the on-board unit to the driver in the vehicle comprises the following steps:

step 4.1: after receiving the broadcasted message by the on-board unit, determining whether the broadcasted message is received or processed; if yes, perform the step 3.4; if no, perform step 4.2;

step 4.2: determining whether the broadcasted message is related with other messages; if yes, co-process the broadcasted message and other messages; if no, process the broadcasted message and other messages separately and perform step 4.3;

step 4.3: reading direction information and distance information of an event included in the broadcasted message, reading the vehicle restriction information and processing the event content; determining whether the related message of the broadcasted message is blank, if yes, perform step 4.4; otherwise, save the broadcasted message for the next processing, and return to the step 4.1;

step 4.4: determining whether the check bit of the broadcasted message is correct; if yes, perform step 4.5; otherwise, return to the step 4.1; and step 4.5: processing the broadcasted message by the on-board unit and sending the processed information through multimedia to the driver in the vehicle.

\* \* \* \* \*